(12) United States Patent
Yoneyama

(10) Patent No.: US 11,437,676 B2
(45) Date of Patent: Sep. 6, 2022

(54) BATTERY PACK AND PRODUCTION METHOD THEREFOR

(71) Applicant: Panasonic Intellectual Property Management Co., Ltd., Osaka (JP)

(72) Inventor: Akihiro Yoneyama, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 122 days.

(21) Appl. No.: 16/634,179

(22) PCT Filed: Jul. 18, 2018

(86) PCT No.: PCT/JP2018/026967
§ 371 (c)(1),
(2) Date: Jan. 27, 2020

(87) PCT Pub. No.: WO2019/031175
PCT Pub. Date: Feb. 14, 2019

(65) Prior Publication Data
US 2020/0411816 A1   Dec. 31, 2020

(30) Foreign Application Priority Data
Aug. 10, 2017  (JP) .............................. JP2017-155138

(51) Int. Cl.
*H01M 50/20* (2021.01)
*H01M 10/613* (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC .................................................. H01M 50/238
See application file for complete search history.

(56) References Cited

U.S. PATENT DOCUMENTS

2011/0008659 A1   1/2011   Okada et al.
2016/0293926 A1   10/2016  Yamada

FOREIGN PATENT DOCUMENTS

CN   101950797 A   1/2011
CN   204732459 U   10/2015
(Continued)

OTHER PUBLICATIONS

International Search Report of PCT application No. PCT/JP2018/026967 dated Sep. 18, 2018.
(Continued)

*Primary Examiner* — Maria Laios
*Assistant Examiner* — Jordan E Berresford
(74) *Attorney, Agent, or Firm* — McDermott Will & Emery LLP

(57) ABSTRACT

A battery pack includes: a plurality of battery modules disposed adjacent to each other in a first direction inside a pack case, each of the plurality of battery modules including a plurality of battery cells disposed side by side in a second direction, the second direction being orthogonal to the first direction; and a side-frame disposed between the battery modules disposed adjacent to each other in the first direction inside the pack case. The side-frame includes two side-walls and a joint. The two side-walls elastically press side-surfaces, in the first direction, of the battery modules disposed adjacent to each other. The side-frame has a long-length shape with a U-shaped cross section. In a state where the side-frame is removed from the battery modules disposed adjacent to each other, a distance between the two side-walls
(Continued)

of the side-frame becomes larger as the two side-walls go away toward opposite the joint.

5 Claims, 8 Drawing Sheets

(51) Int. Cl.
 *H01M 10/625* (2014.01)
 *H01M 10/647* (2014.01)
 *H01M 10/6554* (2014.01)
 *H01M 10/6567* (2014.01)
(52) U.S. Cl.
 CPC ..... *H01M 10/647* (2015.04); *H01M 10/6554* (2015.04); *H01M 10/6567* (2015.04); *H01M 2220/20* (2013.01)

(56) References Cited

FOREIGN PATENT DOCUMENTS

| | | |
|---|---|---|
| JP | 5960289 B | 8/2016 |
| JP | 2016-189248 | 11/2016 |
| JP | 2017050164 A * | 3/2017 |
| KR | 101799537 B1 * | 11/2017 |

OTHER PUBLICATIONS

English Translation of Chinese Office Action dated Jan. 19, 2022 for the related Chinese Patent Application No. 201880049803.2.

* cited by examiner

BATTERY PACK AND PRODUCTION METHOD THEREFOR

CROSS-REFERENCE TO RELATED APPLICATIONS

This application is a U.S. national stage application of the PCT International Application No. PCT/JP2018/026967 filed on Jul. 18, 2018, which claims the benefit of foreign priority of Japanese patent application 2017-155138 filed on Aug. 10, 2017, the contents all of which are incorporated herein by reference.

TECHNICAL FIELD

The present disclosure relates to a battery pack and a method for manufacturing the battery pack.

BACKGROUND ART

A conventionally known battery pack includes a plurality of battery modules. Further, the plurality of battery modules are formed independently of one another. For example, PTLS 1 and 2 each disclose a configuration in which a plurality of box-shaped (=rectangular, or prismatic) batteries are disposed side by side with spacers (PTL 1) or separators (PTL 2) in-between. In addition, disposed along both shorter sides of these batteries are bind bars with a great length. In this configuration, both ends of each bind bar are fixed to two end plates, and these end plates are disposed at respective ends of an array of the plurality of batteries in a battery module. Moreover, in the configuration disclosed in PTL 1, the end plates are fixed to a bottom plate positioned opposite bottoms of the plurality of batteries.

CITATION LIST

Patent Literature

PTL 1: Japanese Patent No. 5960289
PTL 2: Unexamined Japanese Patent Publication No. 2016-189248

SUMMARY OF THE INVENTION

As described above, a battery pack includes a plurality of independent battery modules. In this battery pack, battery cells, each of which serves as a single cell unit, are positioned by bottom plates independently provided for the plurality of battery modules and components, such as bind bars, of the battery modules. This configuration may involve using a large number of components. Thus, there is a demand for a modification to decrease weight and cost. Moreover, a configuration of a battery module determines a layout of battery cells and accordingly may lower flexibility of the layout of the battery cells inside a battery pack.

An object of the present disclosure is to provide: a battery pack that enables battery cells to be positioned, is formed of a small number of components, and allows the battery cells to be laid out with improved flexibility; and a method of manufacturing the battery pack.

A battery pack according to an aspect of the present disclosure includes: a pack case; a plurality of battery modules disposed adjacent to each other in a first direction inside the pack case, each of the plurality of battery modules including a plurality of battery cells disposed side by side in a second direction, the second direction being orthogonal to the first direction; and a side-frame disposed between the battery modules disposed adjacent to each other in the first direction inside the pack case. The side-frame includes two side-walls and a joint, the two side-walls elastically press side-surfaces, in the first direction, of the battery modules disposed adjacent to each other, and the joint joins one end of each of the two side-walls together. The side-frame has a long-length shape with a U-shaped cross section. In a state where the side-frame is removed from the battery modules disposed adjacent to each other, a distance between the two side-walls of the side-frame becomes larger as the two side-walls go away toward opposite the joint.

A method for manufacturing a battery pack according to another aspect of the present disclosure is provided. The battery pack includes a pack case, a plurality of battery modules disposed adjacent to each other in a first direction inside the pack case, each of the plurality of battery modules including a plurality of battery cells disposed side by side in a second direction, the second direction being orthogonal to the first direction, and a side-frame disposed between the battery modules disposed adjacent to each other in the first direction inside the pack case. The side-frame includes two side-walls and a joint, the two side-walls elastically pressing side-surfaces, in the first direction, of the battery modules disposed adjacent to each other; and the joint joins one end of each of the two side-walls together. The side-frame has a long-length shape with a U-shaped cross section. A distance between the two side-walls of the side-frame becoming larger as the two side-walls go away toward opposite the joint. The above method includes pushing the joint of the side-frame in between the battery packs disposed adjacent to each other inside the pack case, while the two side-walls are elastically deformed so as to decrease a distance between another end of each of the two side-walls.

With the battery pack and the method for manufacturing the battery pack according to the present disclosure, it is possible to position battery cells in a first direction by using a side-frame, to form the battery pack with a small number of components, and to lay out the battery cells with improved flexibility.

DESCRIPTION OF EMBODIMENT

Figure 1:
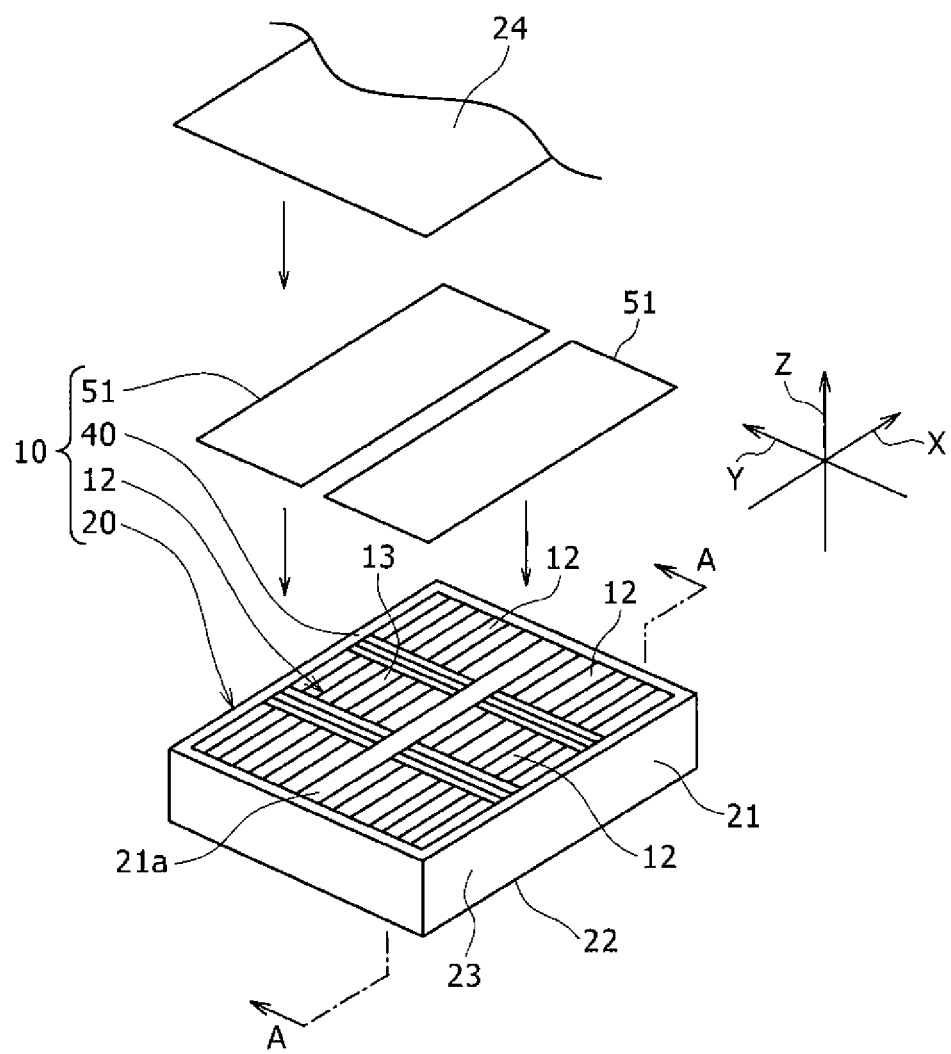
FIG. 1 is an exploded perspective view of a battery pack according to an example of an exemplary embodiment, with some components detached from the battery pack.

A battery pack according to an example of an exemplary embodiment will be described below in detail. Drawings referenced in a description of the exemplary embodiment are schematically drawn, and dimensions and proportions of configuration elements illustrated in the drawings may differ from those of actual components. Thus, specific dimensions and proportions should be understood in view of the following description. In the description herein, "substantially identical" means absolutely identical, as well as virtually identical, for example. Other words modified by "substantially" should be interpreted in the same manner. An "end" of an object means an edge and a surrounding portion of the object. Shapes, materials, piece counts, and other particulars described below are provided for the purpose of illustration and may be changed depending on specifications of battery packs. In the following description, identical or equivalent components are denoted by identical reference signs.

Figure 2:
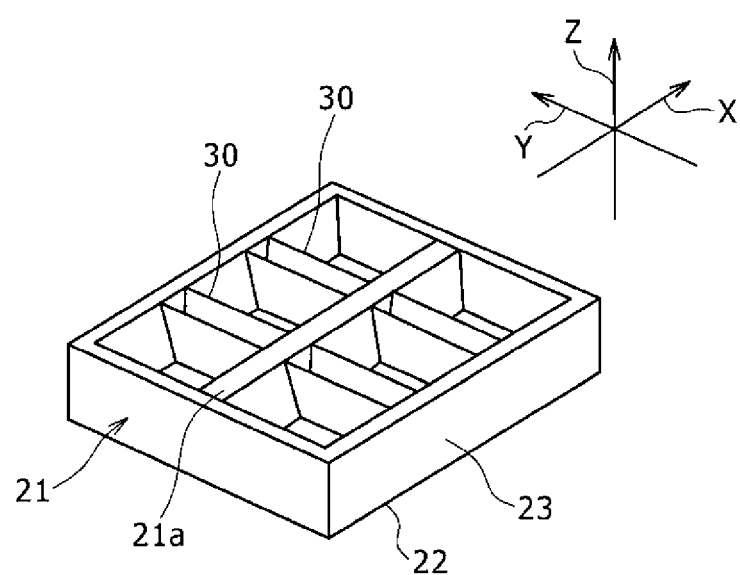
FIG. 2 is a perspective view of the battery pack illustrated in FIG. 1, with battery modules and side-binding bars omitted.
Figure 3:
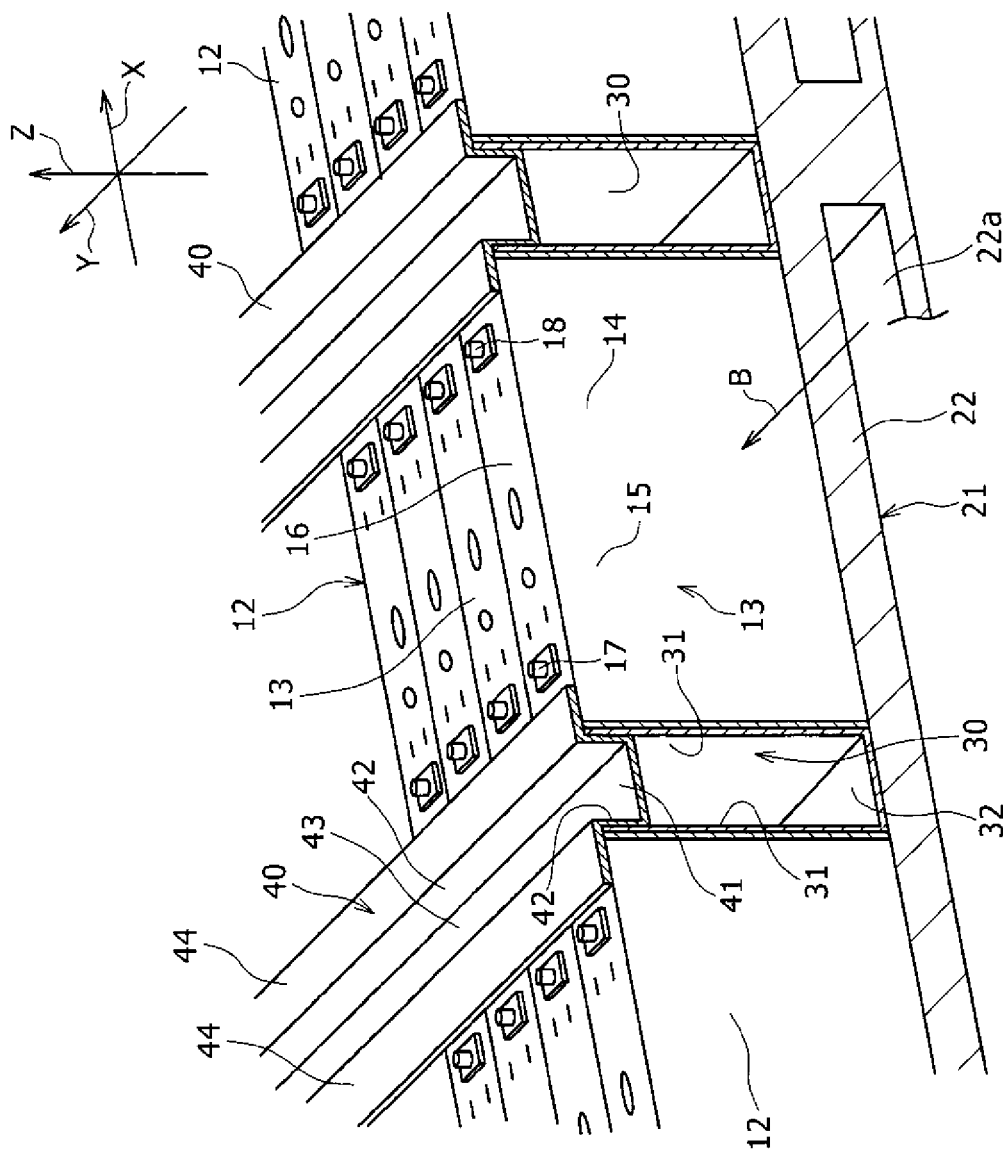
FIG. 3 is an enlarged perspective view of cross section A-A in FIG. 1.

FIG. 1 is an exploded perspective view of battery pack 10 with some components detached from battery pack 10. FIG. 2 is a perspective view of battery pack 10 with battery modules 12 and side-binding bars 40 omitted. FIG. 3 is an enlarged perspective view of cross section A-A in FIG. 1. Battery pack 10 accommodates a plurality of battery modules 12 arranged adjacent to each other both in lateral direction X, referred to as a first direction, and in lengthwise direction Y, referred to as a second direction; lateral direction X is orthogonal to lengthwise direction Y. FIGS. 1 and 3 illustrate an example in which three battery modules 12 are disposed adjacent to each other in lateral direction X and two battery modules 12 are disposed adjacent to each other in lengthwise direction Y. In FIGS. 1 to 3 and FIG. 4 referenced later, a lateral direction is denoted by X, a lengthwise direction is denoted by Y, and a height direction orthogonal to both lateral direction X and lengthwise direction Y is denoted by Z.

Battery pack 10 includes pack case 20, a plurality of side-frames 30, the plurality of battery modules 12, and the plurality of side-binding bars 40. Pack case 20 has case body 21 and lid 24. Case body 21 has peripheral wall 23 erected on an entire edge of bottom plate 22 having a rectangular shape. Case body 21 has an opening on a top. In a description that will be given below, the opening is formed on the top of case body 21 and bottom plate 22 is formed on a bottom of case body 21. The top and the bottom are terms used for the convenience of description.

Lid 24 has a rectangular, planar shape. Lid 24 is attached to an upper edge of case body 21 with bolts, for example, thereby covering the aperture to constitute pack case 20.

Partition plate 21a that extends in lateral direction X is fixed to an upper surface of bottom plate 22 of case body 21 at a center in lengthwise direction Y. As illustrated in FIG. 2, four side-frames 30 are disposed inside case body 21. Further, partition plate 21a defines two inner spaces of case body 21, and two side-frames 30 are disposed away from each other in lateral direction X inside each inner space. Lower edges of side-frames 30 are fixed to bottom plate 22 with screws 38 (see FIG. 4). Details of a configuration of each side-frame 30 will be described later.

As illustrated in FIGS. 1 and 3, partition plate 21a and side-frames 30 define a plurality of spaces inside case body 21, and the plurality of battery modules 12 are disposed in the respective spaces. As described later, after the plurality of battery modules 12 have been disposed inside case body 21, side-frames 30 are actually pushed in between adjacent battery modules 12, and then the lower edges of side-frames 30 are fixed to bottom plate 22 of case body 21. FIG. 2 is a view for helping an understanding of a layout of side-frames 30.

As illustrated in FIG. 3, each of the plurality of battery modules 12 includes a plurality of battery cells 13 disposed side by side in lengthwise direction Y with lengthwise-interspace spacers (not illustrated) having a planar shape in-between. Each of battery cells 13 serves as a cell unit; each of lengthwise-interspace spacers serves as an insulating member. Each of the lengthwise-interspace spacers may be made of an insulating material such as a resin. Instead of the lengthwise-interspace spacers, resin separators may be used as the insulating members. Such separators may have a predetermined shape other than a planar shape.

Each battery cell 13 is a box-shaped (=rectangular, or prismatic), dischargeable secondary battery. Examples of the secondary battery include lithium ion batteries. Alternatively, the secondary battery may be another battery such as a nickel hydride battery. Each battery cell 13 includes: cell case 14 that has a cubic shape; and an electrode assembly (not illustrated) contained in cell case 14 together with electrolyte. Cell case 14 is formed by covering an upper aperture of box-shaped cell case body 15 with sealing plate 16. The electrode assembly is formed by alternately laminating positive-electrode and negative-electrode plates with separators in-between. Positive-electrode terminal 17 and negative-electrode terminal 18 protrude from respective ends of sealing plate 16 in a longitudinal direction. Positive-electrode terminal 17 is connected to the positive-electrode plates, whereas negative-electrode terminal 18 is connected to the negative-electrode plates.

As described above, the plurality of battery cells 13 in each battery module 12 are disposed side by side in lengthwise direction Y with the insulating members such as the lengthwise-interspace spacers in-between. Further, an orientation of positive-electrode terminals 17 and negative-electrode terminals 18 on sealing plates 16 of adjacent battery cells 13 are opposite to each other in a longitudinal direction. In this case, the positive-electrode terminals and negative-electrode terminals of adjacent battery cells 13 which are positioned adjacent to each other in lengthwise direction Y are connected together via bus bars (not illustrated), so that the plurality of battery cells 13 are electrically connected in series.

Alternatively, of the plurality of battery cells 13, the positive-electrode terminals may be disposed at one ends of sealing plates 16 in the longitudinal direction, and the negative-electrode terminals may be disposed at the other ends of sealing plates 16 in the longitudinal direction. Further, the plurality of positive-electrode terminals disposed side by side in lengthwise direction Y may be connected together via a bus bar, whereas the plurality of negative-electrode terminals disposed side by side in lengthwise direction Y may be connected together via another bus bar. In this way, the plurality of battery cells may be connected together in parallel. Alternatively, some of the plurality of battery cells are electrically connected in parallel to form a battery cell group. Then, a plurality of battery cell groups formed in this manner may be electrically connected in series.

The plurality of battery modules 12 are disposed side by side in lateral direction X inside pack case 20. Bottom plate 22 of pack case 20 functions as a cooling plate to cool battery modules 12. For example, coolant passages 22a through which coolant such as air or water flows are formed in bottom plate 22 at a plurality of locations. Coolant passages 22a are connected to a coolant flow path (not illustrated) outside battery pack 10. FIG. 1 does not illustrate the coolant passages provided in bottom plate 22. It should be noted that the coolant passages in the bottom plate do not necessarily have to be formed. Alternatively, for example, a shape or material that exhibits a good radiation performance may be used for the bottom plate.

Figure 4:
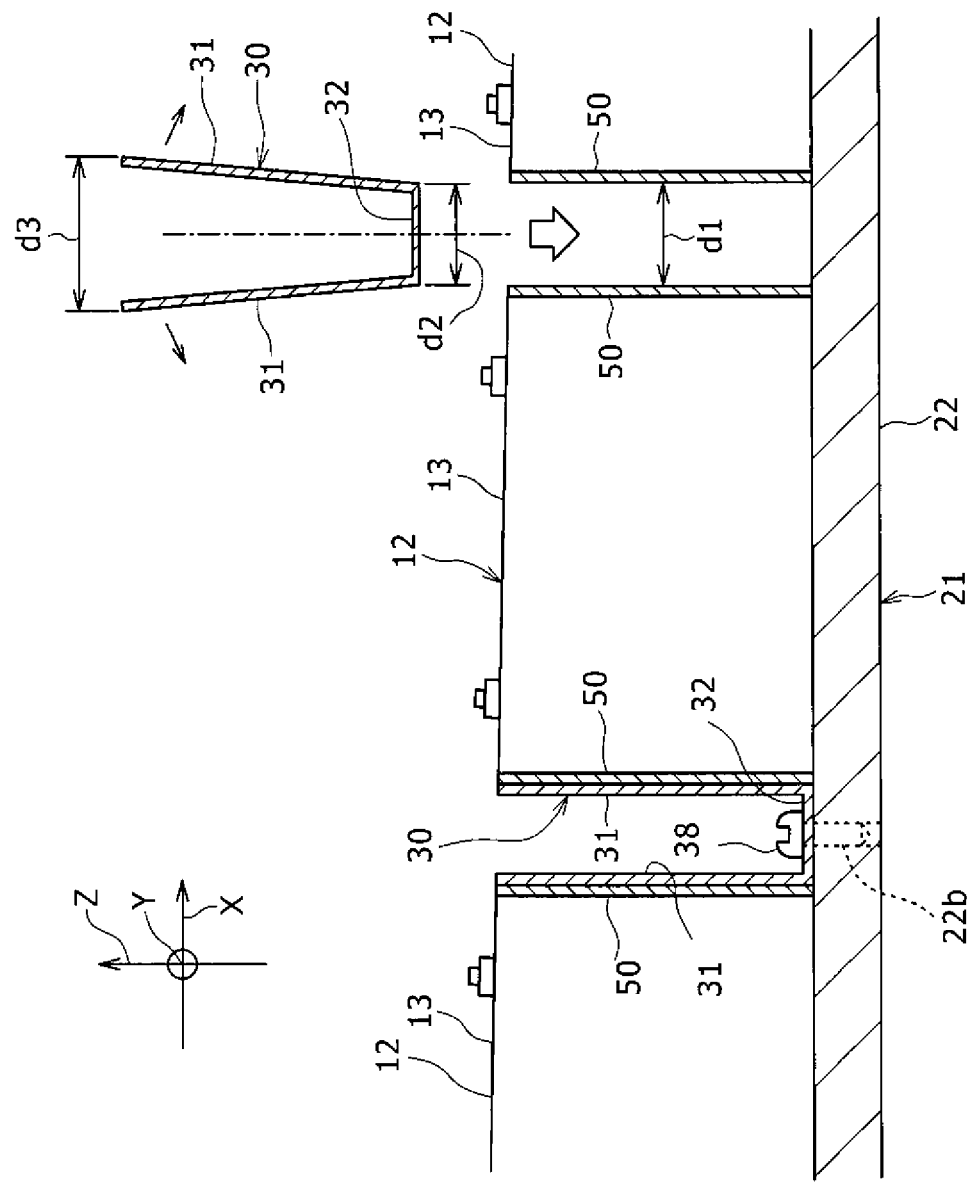
FIG. 4, which is a view related to a state of FIG. 3 seen from a direction of arrow B, illustrates a state in which side-frames are pushed in between adjacent battery modules.
Figure 5:
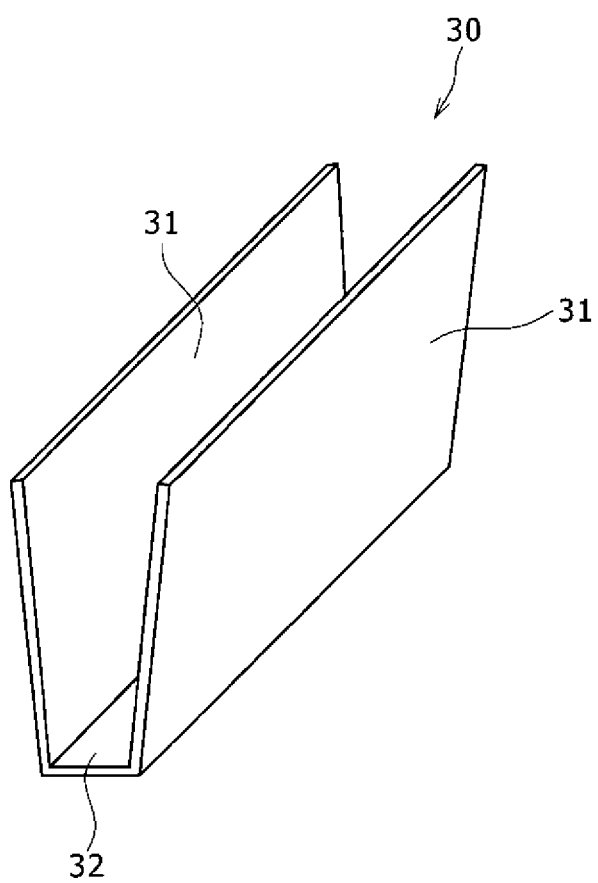
FIG. 5 is a perspective view of a side-frame removed from FIG. 4.

The plurality of side-frames 30 are disposed between battery modules 12 disposed adjacent to each other in lateral direction X inside case body 21. FIG. 4, which is a view related to a state of FIG. 3 seen from a direction of arrow B, illustrates a state in which side-frames 30 are pushed in between adjacent battery modules 12. FIG. 5 is a perspective view of side-frame 30 removed from FIG. 4.

As illustrated in FIGS. 4 and 5, each side-frame 30, which has a U-shaped cross section and is formed so as to extend in lengthwise direction Y with a long-length shape, includes two side-walls 31 and joint 32; joint 32 joins one ends of two side-walls 31 together. Each of two side-walls 31 and joint 32 has a planar shape. This simple shape of side-frames 30 can contribute to cost reduction. In a state before each side-frame 30 is disposed between adjacent battery modules 12 or in a state after each side-frame 30 is removed from adjacent battery modules 12, a distance between two side-walls 31 increases toward the top opposite joint 32.

Each side-frame 30 may be made of a metal such as iron, steel, aluminum alloy, or stainless alloy. When each side-frame 30 is made of steel, the steel may be a high-strength steel. For example, each side-frame 30 may be formed by bending a metal or by extruding a metal. Alternatively, each side-frame 30 may be made of a resin material such as polycarbonate resin.

Joint 32 of each side-frame 30 is provided with one or more through-holes in a thickness direction, or in height direction Z, and the through-holes are formed at respective locations arrayed in a longitudinal direction of joint 32, or in lengthwise direction Y. To fix side-frames 30 to case body 21, screws 38 described later, which serves as fastening members, pass through the through-holes.

Each side-frame 30 is disposed between battery modules 12 disposed adjacent to each other in lateral direction X, and two side-walls 31 elastically press side-surfaces of battery modules 12 in lateral direction X. In this case, separators 50, which are lengthwise-interspace spacers having a planar shape, are disposed on side-surfaces of battery modules 12 in lateral direction X. Side-walls 31 of side-frames 30 elastically press battery modules 12 via separators 50. As described above, side-walls 31 of each side-frame 30 are farther from each other toward the top in a state before each side-frame 30 is disposed between adjacent battery modules 12. Distance d1 (see FIG. 4) between two separators 50 on adjacent battery modules 12 is equal to or longer than length d2 (see FIG. 4), in lateral direction X, of joint 32 of each side-frame 30 and shorter than distance d3 between the upper edges of side-walls 31. Thus, when joint 32 of side-frame 30 is pushed downward in between two separators 50, as indicated by arrow α in FIG. 4, side-frame 30 is elastically deformed to decrease a distance between the upper edges of two side-walls 31. In this case, repulsion of side-frame 30 is applied to the adjacent battery modules 12 via side-walls 31. As a result, side-walls 31 elastically press battery modules 12. Furthermore, screw 38 (FIG. 4) downwardly penetrates joint 32 of side-frame 30 and is coupled to threaded hole 22b formed in bottom plate 22 of case body 21. Side-frame 30 is thereby fixed to a bottom of pack case 20. In this way, battery modules 12 are positioned in lateral direction X. Since an opening is formed in side-frame 30 at the top, it is possible to easily perform a work of rotating screw 38 by using a tool such as a driver from an upper side of side-frame 30.

One end of each side-frame 30 in a longitudinal direction, or in lengthwise direction Y, is abutted against a side-surface of partition plate 21a fixed to case body 21. In addition, the other end of each side-frame 30 in lengthwise direction Y may also be abutted against a side-surface of case body 21.

In a method of manufacturing battery pack 10, battery modules 12 are first disposed adjacent to each other in lateral direction X inside case body 21. In addition, side-frames 30, in which the distance between two side-walls 31 increases farther from joint 32, are prepared. Then, joints 32 of side-frames 30 are pushed in between adjacent battery modules 12, with the other ends, or the upper edges, of two side-walls 31 elastically deformed to decrease the distance between the upper ends. Side-frames 30 are thereby disposed between adjacent battery modules 12. After that, joints 32 are fixed to bottom plate 22 of case body 21 with screws 38, as described above. In this way, side-frames 30 are disposed between adjacent battery modules 12. As a result, two side-walls 31 of each side-frame 30 are positioned substantially parallel to each other, as illustrated in FIG. 3. As described above, in a preferable manufacture method, the plurality of battery modules 12 are first disposed inside case body 21, and then side-frames 30 are pushed in and disposed between adjacent battery modules 12. However, the plurality of side-frames 30 may be first disposed inside case body 21, and then battery modules 12 may be pushed in and disposed between adjacent side-frames 30. In this case, after the plurality of side-frames 30 have been fixed to bottom plate 22 of case body 21 with screws 38, battery cells 13 constituting battery modules 12 may be placed with side-frames 30 elastically deformed to decrease the distance between the upper edges of side-frames 30.

As illustrated in FIG. 3, the plurality of side-binding bars 40 are pushed into and fixed in the upper openings of side-frames 30 that have been disposed in the above manner. Each side-binding bar 40 that is formed so as to extend in lengthwise direction Y includes insertion section 41 and two flanges 44. Insertion section 41 includes: two opening-side walls 42 parallel to each other; and opening-side joint 43 that joins one sides of two opening-side walls 42 together. Each of opening-side walls 42 and opening-side joint 43 has a planar shape. Two flanges 44 extend outwardly in a width direction from the other edges, or the upper edges, of two opening-side walls 42. Each side-binding bar 40 may be made of a metal or a resin, for example. For example, each side-binding bar 40 may be made of a metal such as iron, steel, aluminum alloy, or stainless alloy. When each side-binding bar 40 is made of steel, the steel may be a high-strength steel.

Side-binding bars 40 are fixed to corresponding side-frames 30, with insertion section 41 pushed in and disposed between the other edges, or the upper edges, of two side-walls 31 of side-frames 30. As a result, two flanges 44 are pushed against one edges, or the upper edges, of battery cells 13 disposed adjacent to each other in lateral direction X. In this way, battery cells 13 are prevented from floating. When side-frames 30 are disposed between adjacent battery modules 12, the distance between two side-walls 31 of each side-frame 30 may increase toward the upper edge and may be shorter than the distance before assembly.

Returning to FIG. 1, case body 21 accommodates the plurality of battery modules 12, side-frames 30 (see FIGS. 2 and 3), and side-binding bars 40. In this state, circuit boards 51 having flexibility are further disposed on upper sides of the plurality of battery modules 12 which correspond to regions over the two spaces defined by partition plate 21a, with an upper insulating paper sheet (not illustrated) in-between. Mounted on each circuit board 51 are a central processing unit (CPU), memory, and other components. Circuit boards 51 are connected to positive-electrode terminals 17 (see FIG. 3) of corresponding battery cells 13 and monitor voltages across individual battery cells 13. Furthermore, in order to measure temperatures of battery cells 13, circuit boards 51 may be connected to temperature measuring units that are in contact with positive-electrode or negative-electrode terminals or bus bars connected to the positive-electrode or negative-electrode terminals. Lid 24 is coupled to case body 21 so as to cover upper surfaces of cover circuit boards 51. Optionally, the circuit boards may be disposed outside pack case 20.

According to battery pack 10 and the method for manufacturing battery pack 10 described above, side-frames 30 press the plurality of battery cells 13 in lateral direction X, thereby positioning battery cells 13 in lateral direction X. In addition, the plurality of battery cells 13 in each individual battery module 12 do not have to be integrated with bind bars and two end plates. This configuration contributes to a decreased number of components of battery pack 10. As a result, it is possible to achieve low-cost, lightweight battery pack 10. Moreover, frames between battery modules disposed adjacent to each other in lateral direction X do not necessarily have to have a closed, square cross section. This configuration also contributes to the weight reduction in battery pack 10. By mounting battery pack 10 having a light weight in a vehicle, energy consumption of the vehicle can be decreased. Furthermore, the number of and a layout of battery cells 13 inside each battery module 12 can be changed as appropriate. In short, battery cells 13 can be laid out inside battery pack 10 with improved flexibility.

By varying an angle between the upper edges of each side-frame 30, press force that each side-frame 30 applies to battery cells 13 in order to position battery cells 13 in lateral direction X can be adjusted. Consequently, it is possible to position battery cells 13 that have been unevenly arrayed in each of battery modules 12 disposed adjacent to each other in lateral direction X and to protect battery cells 13 from excessively strong pressing force.

Side-frames 30 can function as a material to reinforce pack case 20, because one end of each side-frame 30 in a longitudinal direction is abutted against the side-surface of partition plate 21a fixed to pack case 20. In this way, rigidity of pack case 20 is enhanced. If no partition plate is disposed inside a pack case, one or both ends of each side-frame 30 in a longitudinal direction may be abutted against an inner wall surface of the pack case. In this way, rigidity of the pack case is also enhanced.

Figure 6:
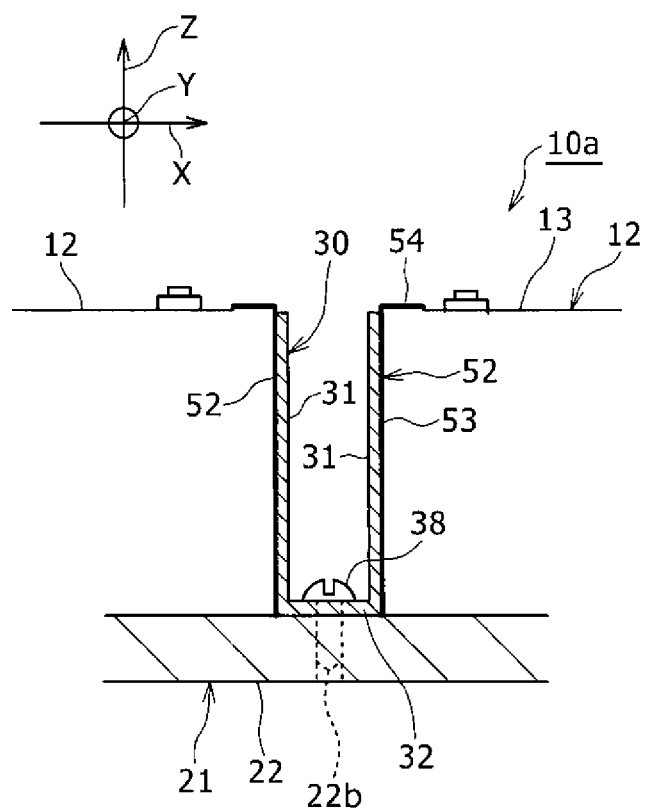
FIG. 6, which is a view related to a left portion of FIG. 4, illustrates a battery pack according to another example of the exemplary embodiment.

FIG. 6, which is a view related to a left portion of FIG. 4, illustrates battery pack 10a according to another example of the exemplary embodiment. In a configuration of this example, side-frame 30 is pushed in between side-surfaces of battery modules 12 disposed adjacent to each other in lateral direction X with insulating sheets 52 in-between; each of insulating sheets 52 has an L-shaped cross section and extends in lengthwise direction Y. Each insulating sheet 52 may be made of an insulating material such as a resin. Each insulating sheet 52 includes: sheet body 53 that has a planar shape and is disposed between side-frame 30 and corresponding battery module 12; and angled portion 54 that is joined to an upper edge of sheet body 53 and angled at a substantially right angle toward corresponding battery module 12. Angled portion 54 is pressed against the upper edge of corresponding battery module 12.

Referring to FIG. 3, insertion section 41 of each side-binding bar 40 is pushed in and disposed between upper portions of two side-walls 31 of side-frame 30 illustrated in FIG. 6. In this state, two flanges 44 of each side-binding bar 40 are pressed against the upper sides of adjacent battery cells 13 with angled portions 54 of insulating sheets 52 in-between. Other configurations and functions are similar to the configurations and functions illustrated in FIGS. 1 to 5.

Figure 7:
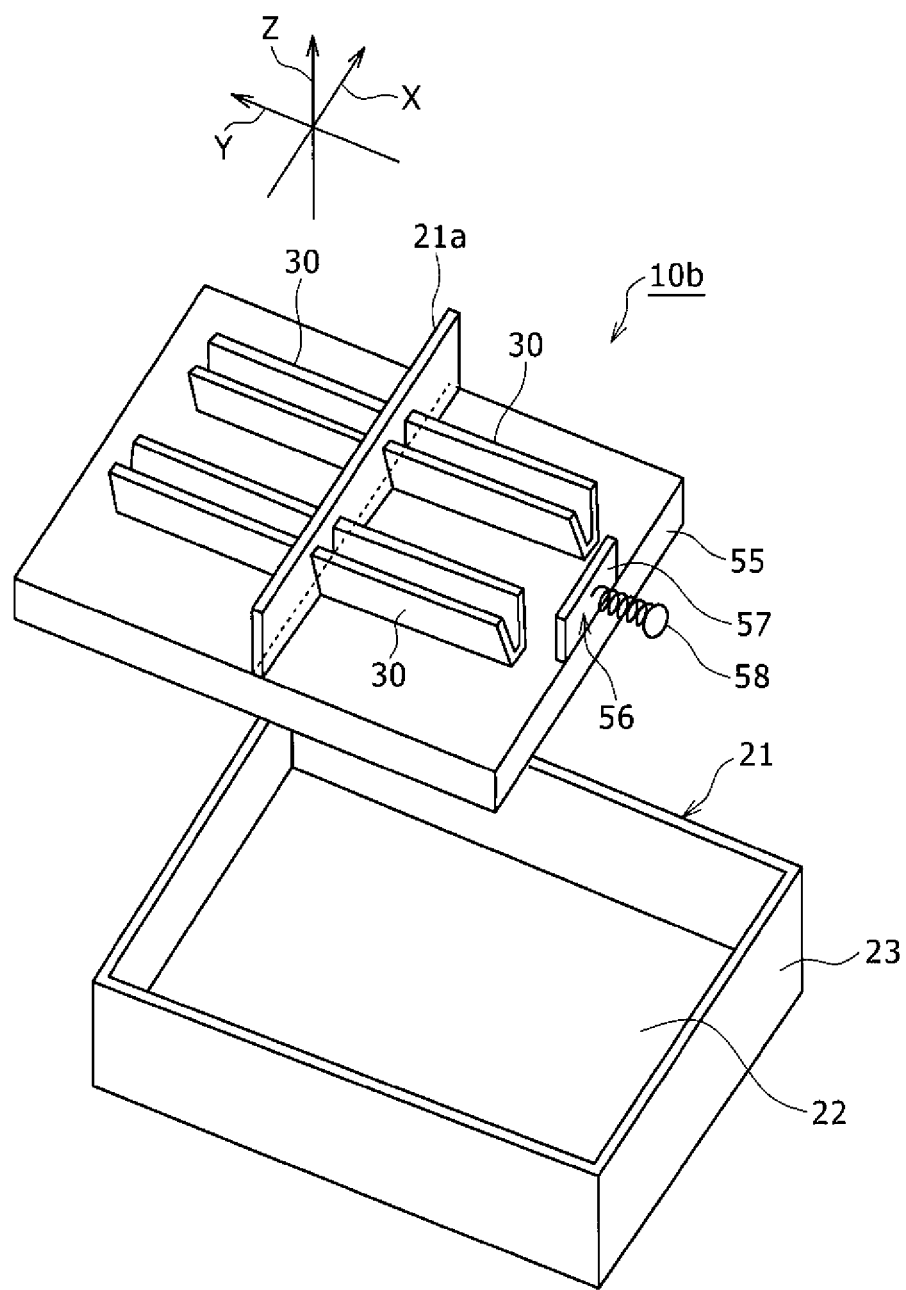
FIG. 7 is an exploded, perspective view of a battery pack according to still another example of the exemplary embodiment, with some components omitted.

FIG. 7 is an exploded, perspective view of battery pack 10b according to still another example of the exemplary embodiment, with some components omitted. In a configuration of this example, fixture plate 55 is disposed over bottom plate 22 of case body 21, and partition plate 21a and side-frames 30 are fixed to an upper surface of fixture plate 55. FIG. 7 does not illustrate battery modules 12 (see FIG. 3). However, side-frames 30 are actually disposed between the plurality of battery modules 12 disposed adjacent to each other, and fixed to fixture plate 55. One end of each side-frame in a longitudinal direction is abutted against the side-surface of partition plate 21a, but the other end of each side-frame in the longitudinal direction is apart from the wall surface of peripheral wall 23 of case body 21.

Disposed at one side of each battery module 12 in a longitudinal direction which is opposite partition plate 21a is spring-attached plate 56. Spring-attached plate 56 includes: main body 57 having a substantially planar shape; and spring 58, an end of which faces battery module 12 and is coupled to a surface of main body 57. The other end of spring 58 is abutted against the wall surface of peripheral wall 23 of case body 21. Spring 58 is a coil spring, but alternatively may be a blade spring or a sheet member formed of an elastic material, for example. Spring 58 of spring-attached plate 56 formed in this manner applies elastic force to one side, in the longitudinal direction, of each battery module 12 disposed between side-frames in lateral direction X. As a result, the other side of each battery module 12 in the longitudinal direction is elastically pressed against the side-surface of partition plate 21a. Battery cells 13 (see FIG. 3) are thereby positioned. FIG. 7 illustrates a single spring-attached plate 56, but two spring-attached plates 56 are actually disposed at ends of the plurality of battery modules opposite partition plate 21a. In addition, fixture plate 55 may be provided with a coolant passage through which a coolant flows, although the coolant passage is not illustrated. In this case, an inlet and outlet of the coolant passage may be connected to an external coolant flow path via ports (not illustrated) formed in peripheral wall 23 of case body 21. Other configurations and functions are similar to the configurations and functions illustrated in FIGS. 1 to 5.

Figure 8:
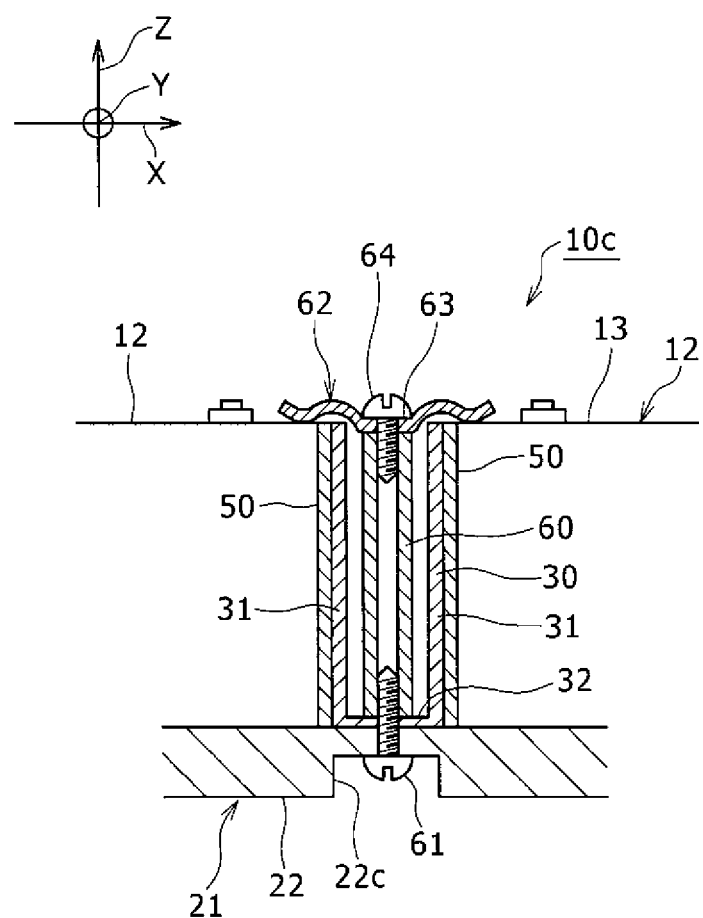
FIG. 8, which is a view related to a state of FIG. 3 seen from the direction of arrow B, illustrates a battery pack according to further another example of the exemplary embodiment.

FIG. 8, which is a view related to a state of FIG. 3 seen from the direction of arrow B, illustrates battery pack 10c according to further another example of the exemplary embodiment. In a configuration of this example, pillar member 60 having a cylindrical shape is disposed inside side-frame 30. Pillar member 60 has a threaded hole across an inner circumferential surface or threaded holes only at both ends in an axial direction. In addition, screw 61, a head of which is disposed in groove 22c formed on bottom plate 22 of case body 21, upwardly penetrates bottom plate 22 and joint 32 of side-frame 30. A portion of screw 61 which protrudes upward from joint 32 is coupled to a lower portion of a threaded hole in pillar member 60. Pillar member 60 is thereby fixed in an upright position inside side-frame 30.

Pillar member 60 is fixed to side-binding bar 62, which presses an upper side of a corresponding one of battery modules 12 disposed adjacent to each other in lateral direction X. More specifically, side-binding bar 62, which has a wavy cross section, extends in lengthwise direction Y with a long-length shape. Side-binding bar 62 is provided with plate 63, which has a planar shape, at a center in lateral direction X. In addition, screw 64 downwardly penetrates plate 63 with an end coupled to an upper portion of a threaded hole in pillar member 60, thereby pressing both outer portions of side-binding bar 62 in lateral direction X against upper sides of battery modules 12. In a configuration of this example, screw 64 is coupled to an upper side of pillar member 60 with an upper end disposed near an upper opening in side-frame 30. Thus, this configuration can facilitate a work of coupling screw 64. In this case, single pillar member 60 may be disposed inside a portion of side-frame 30 in a longitudinal direction. Alternatively, a plurality of pillar members 60 may be disposed at locations in the longitudinal direction. Other configurations and functions are similar to the configurations and functions illustrated in FIGS. 1 to 5.

The invention claimed is:

1. A battery pack comprising:
a pack case;
a plurality of battery modules disposed on an inner surface of the pack case and in line with a first direction, each of the plurality of battery modules including a plurality of battery cells disposed side by side in a second direction, the second direction being orthogonal to the first direction; and
a side-frame disposed between two adjacent battery modules of the plurality of battery modules, wherein
the side-frame includes two side-walls and a joint, the joint connecting one end of one of the two side-walls and one end of another one of the two side-walls to have a U-shaped cross section, the joint facing the inner surface of the pack case when the side-frame is disposed between the two adjacent battery modules,
a distance between the two side-walls increases from the joint toward distal ends of the two side-walls so that when the side-frame is disposed between the two adjacent battery modules, the two side-walls elastically press the adjacent battery modules in order for the adjacent battery modules to be spaced apart from each other,
the battery pack further comprises a side-binding bar that includes an insertion section and two flanges, the insertion section having two opening-side walls parallel to each other and an opening-side joint that joins one end of each of the two opening-side walls together, the flanges extending outwardly in a width direction from another end of each of the two opening-side wall, the side-binding bar having a long-length shape, and
the side-binding bar is fixed to the side-frame in a state where the insertion section is disposed between the distal ends of the two side-walls of the side-frame, one of the two flanges is pressed against one of the adjacent battery cells, and another one of the two fingers is pressed against another one of the adjacent battery cells.

2. The battery pack according to claim 1, wherein each of the two side-walls and the joint has a planar shape.

3. The battery pack according to claim 1, wherein the joint has a through-hole, and
the side-frame is fixed to the inner surface of the pack case by a fastening member that passes through the through-hole.

4. The battery pack according to claim 1, wherein
at least one end of the side-frame in a longitudinal direction is abutted against a wall surface of the pack case or a side-surface of a partition plate fixed to the pack case.

5. A method for manufacturing a battery pack, the battery pack including a pack case,
a plurality of battery modules disposed on an inner surface of the pack case and in line with a first direction, each of the plurality of battery modules including a plurality of battery cells disposed side by side in a second direction, the second direction being orthogonal to the first direction, and
a side-frame disposed between two adjacent battery modules of the plurality of battery modules, wherein
the side-frame includes two side-walls and a joint, the joint connecting one end of one of the two side-walls and one end of another one of the two side-walls to have a U-shaped cross section, the joint facing the inner surface of the pack case when the side-frame is disposed between the two adjacent battery modules,
a distance between the two side-walls increases from the joint toward distal ends of the two side-walls so that when the side-frame is disposed between the two adjacent battery modules, the two side-walls elastically press the adjacent battery modules in order for the adjacent battery modules to be spaced apart from each other,
the battery pack further comprises a side-binding bar that includes an insertion section and two flanges, the insertion section having two opening-side walls parallel to each other and an opening-side joint that joins one end of each of the two opening-side walls together, the flanges extending outwardly in a width direction from another end of each of the two opening-side wall, the side-binding bar having a long-length shape, and
the side-binding bar is fixed to the side-frame in a state where the insertion section is disposed between the distal ends of the two side-walls of the side-frame, one of the two flanges is pressed against one of the adjacent battery cells, and another one of the two fingers is pressed against another one of the adjacent battery cells,
the method comprising,
pushing the joint of the side-frame in between the adjacent battery modules, while the two side-walls are elastically deformed so as to decrease a distance between the distal ends of the two side-walls.

* * * * *